United States Patent
Bruechle et al.

(10) Patent No.: US 10,594,726 B2
(45) Date of Patent: Mar. 17, 2020

(54) DEVICE FOR MONITORING THE TIME AND VEHICLE-TO-X-COMMUNICATION MODULE

(71) Applicant: Continental Teves AG & Co. oHG, Frankfurt (DE)

(72) Inventors: Michael Bruechle, Frankfurt am Main (DE); Marc Menzel, Weimar (DE); Ulrich Stählin, Eschborn (DE)

(73) Assignee: Continental Teves AG & Co. OHG, Frankfurt (DE)

( * ) Notice: Subject to any disclaimer, the term of this patent is extended or adjusted under 35 U.S.C. 154(b) by 0 days.

(21) Appl. No.: 15/662,905

(22) Filed: Jul. 28, 2017

(65) Prior Publication Data
US 2018/0034825 A1     Feb. 1, 2018

(30) Foreign Application Priority Data
Aug. 1, 2016    (DE) .................. 10 2016 214 139

(51) Int. Cl.
| | |
|---|---|
| H04L 29/06 | (2006.01) |
| H04W 4/40 | (2018.01) |
| G06F 21/52 | (2013.01) |
| G06F 1/30 | (2006.01) |
| H04W 12/12 | (2009.01) |
| G06F 1/14 | (2006.01) |
| H04L 29/08 | (2006.01) |
| H04W 4/024 | (2018.01) |
| H04W 4/90 | (2018.01) |

(52) U.S. Cl.
CPC ............ *H04L 63/1466* (2013.01); *G06F 1/14* (2013.01); *G06F 1/30* (2013.01); *G06F 21/52* (2013.01); *H04L 63/1408* (2013.01); *H04L 67/12* (2013.01); *H04W 4/40* (2018.02); *H04W 12/12* (2013.01); *G06F 2221/2151* (2013.01); *H04W 4/024* (2018.02); *H04W 4/90* (2018.02)

(58) Field of Classification Search
CPC ....... H04L 63/123; H04L 67/12; H04L 69/18; H04L 63/1408; H04L 63/1466; G06F 1/14; G06F 21/52; G06F 2221/2151; H04W 12/12; H04W 4/90
See application file for complete search history.

(56) References Cited

U.S. PATENT DOCUMENTS

| | | | | |
|---|---|---|---|---|
| 4,125,772 A * | 11/1978 | Holmes | ............... | H01J 37/1475 250/311 |
| 4,197,582 A * | 4/1980 | Johnston | ................ | G01R 21/00 702/58 |
| 6,937,162 B2 * | 8/2005 | Tokitsu | ................ | G07B 15/063 340/425.5 |
| 7,620,512 B2 * | 11/2009 | Franke | .................... | G04F 1/005 324/676 |

(Continued)

FOREIGN PATENT DOCUMENTS

| | | |
|---|---|---|
| DE | 3732184 C1 | 2/1989 |
| DE | 10260244 A1 | 7/2004 |

(Continued)

*Primary Examiner* — Benyam Haile
*Assistant Examiner* — Mancil Littlejohn, Jr.

(57) ABSTRACT

A device for monitoring the time during an interruption period is presented, wherein a continually decaying state is observed. In addition, a vehicle-to-X-communication module having such a device is also presented.

16 Claims, 1 Drawing Sheet

(56) References Cited

U.S. PATENT DOCUMENTS

| | | | |
|---|---|---|---|
| 9,300,423 B2 | 3/2016 | Rubin et al. | |
| 2002/0029766 A1* | 3/2002 | Grass | F02D 41/22 |
| | | | 123/491 |
| 2002/0084427 A1* | 7/2002 | Saadatmand | H05H 9/00 |
| | | | 250/492.1 |
| 2013/0082686 A1* | 4/2013 | Dong | H02M 3/1582 |
| | | | 324/119 |
| 2014/0368208 A1* | 12/2014 | Yamada | H01M 10/48 |
| | | | 324/433 |
| 2015/0131637 A1* | 5/2015 | Rubin | G08G 9/02 |
| | | | 370/337 |
| 2015/0146605 A1 | 5/2015 | Rubin et al. | |

FOREIGN PATENT DOCUMENTS

| | | |
|---|---|---|
| DE | 102005018518 A1 | 10/2006 |
| DE | 102008059791 A1 | 7/2009 |
| DE | 102014219385 A1 | 3/2016 |
| EP | 3125491 A1 | 2/2017 |

\* cited by examiner

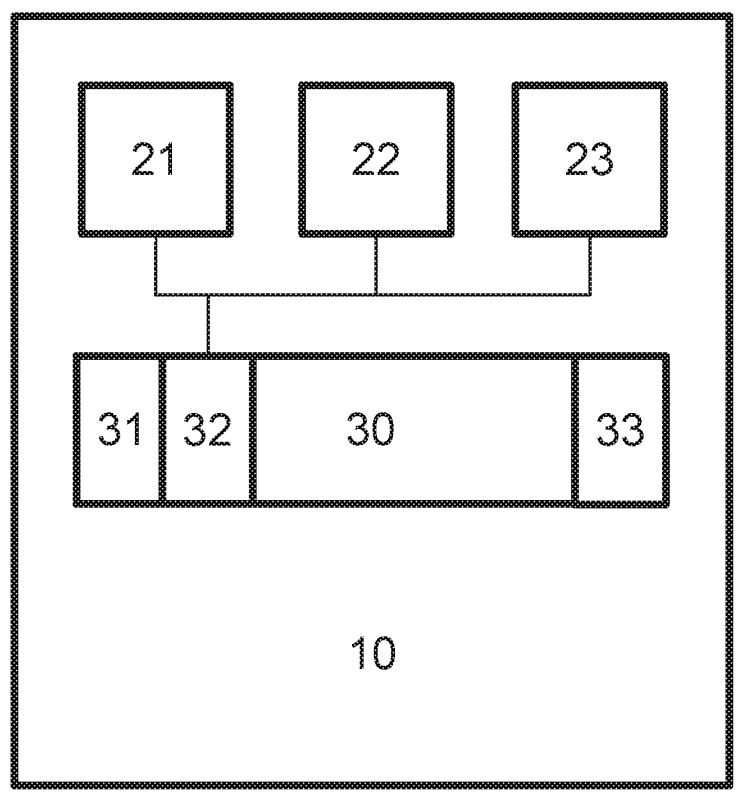

DEVICE FOR MONITORING THE TIME AND VEHICLE-TO-X-COMMUNICATION MODULE

CROSS REFERENCE TO RELATED APPLICATION

This application claims the benefit of German patent application No. 10 2016 214 139.2, filed Aug. 1, 2016, which is hereby incorporated by reference.

TECHNICAL FIELD

The technical field relates to a device for monitoring the time during an interruption period as well as a vehicle-to-X-communication module having such a device.

BACKGROUND

Vehicle-to-X communication, also known as C2X communication, based on IEEE 802.11p, ITS-G5 or IEEE 1609, is the prior art and standardized, and has already been tested in field tests. This technology makes it possible for messages to be exchanged between vehicles which, in turn, makes it possible to notify drivers about possible hazardous situations. The creation time of the respective message is also sent in such messages and is used or filtered by other subscribers.

In order to prevent abuse, the relevant messages are typically signed with certificates and the validity thereof is checked by means of a certificate chain in a control unit. However, these certificates are only valid at certain times.

According to the prior art, a satellite navigation receiver is typically used, for example a GPS receiver, in order to record a time. This time is used throughout the system for synchronization purposes. However, there is a potential threat to the system in that a hacker can reproduce the vehicle environment (for example, satellite navigation signals and vehicle interface, etc.) and generate artificial warning messages or messages for any time and any place. Such artificial messages (for example, emergency brake, traffic jam ahead) can then be recorded and played back at sensitive infrastructure points such as, for example, motorway junctions. This could lead to significant disruptions and pose a hazard to road traffic.

In addition, certificates stored in the control unit could be set to invalid, for example by means of an artificially simulated incorrect time. The control unit can therefore be permanently decommissioned.

It is true that it is in principle possible to supply a clock with power by means of a permanent power supply even in the switched-off state. However, a plausibility check is not always possible due to an interruption in the power supply, which corresponds, for example, to the normal operating condition in a workshop.

As such, it is desirable to present a device for monitoring the time during an interruption period, which makes it possible to carry out plausibility checks of times independently of a power supply. It is, in addition, also desirable to provide a vehicle-to-X communication module having such a device. In addition, other desirable features and characteristics will become apparent from the subsequent summary and detailed description, and the appended claims, taken in conjunction with the accompanying drawings and this background.

BRIEF SUMMARY

The disclosure relates to a device for monitoring the time during an interruption period. The device includes a storage unit which is configured to store a time at the start of the interruption period. The device includes a decay unit which produces a continually decaying state over the interruption period. The device further includes a measuring unit which is configured to measure the state at least at the end of the interruption period. In addition, the device includes a control unit which is configured to generate a duration measure which is indicative of the length of the interruption period on the basis of the common state at the end of the interruption period.

By use of the device, it is possible to also facilitate a plausibility check of times over an interruption period, wherein such an interruption period can, for example, correspond to the length of time of a power failure.

The continually decaying state is, in this case, produced independently of a power supply. Examples are indicated further below.

It is typically known how the state produced in the decay unit decays such that a duration measure can be simply calculated on the basis of the measured state at the end of the interruption period. For example, the state can decay with an exponential function, significantly facilitating a calculation.

The decay unit can, for example, be an electrical capacitor. In this case, the decaying state is typically a voltage which drops across the capacitor.

The capacitor can, in particular, be wired up to at least one resistor such that a time constant of the decaying voltage can be adjusted by means of the capacitor and/or the resistor. For example, the larger the resistor across which the capacitor is discharged is, the higher the time constant can be.

It is understood, however, that other decay units can also be used, which can be based, for example, on radioactive elements, electrical coils or other naturally decaying states.

The measuring unit may, in particular, be configured to also measure the state at the start of the interruption period. The control unit may accordingly be configured to also generate the duration measure on the basis of the measured state at the start of the interruption period. This means that a particularly high accuracy can be achieved since the state is known both at the start and at the end of the interruption period. It is understood that, alternatively or additionally thereto, a defined state may, for example, be present at the start of the interruption period, for example in that a capacitor is maintained at a certain voltage at all times and automatically transitions into the decaying state in the event of a failure in the power supply.

The control unit may be configured to trigger a measurement of the state at the start and/or at the end of the interruption period. This may, in particular, take place automatically such that reliable operation is ensured.

According to a further development, the device may include a plurality of decay units which each produce continually decaying states. Respective decay units can therefore be provided for different durations, which makes it possible to carry out better plausibility checks of times. In particular, the decay units can, in this case, produce states with different time constants of the decay.

In this case, each decay unit may, for example, include its own measuring unit. However, the measuring unit may also be configured, for example with a multiplexer, to measure the states of all of the decay units.

The control unit can be configured to generate a respective duration measure for each decay unit on the basis of a number of measurements of the respective state. As already mentioned further above, this can, for example, be a particular measurement or two particular measurements. The duration measures can then be selected or weighted depending on how long the interruption period has actually been and which duration measure is the most reliable for such a length of the interruption period.

The states of the decay units can, in particular, have different dependences on a number of parameters, in particular temperature, air humidity, radiation, and/or air pressure. Such dependences can therefore be reciprocally compensated.

The control unit can, in particular, be configured to generate an averaged or common duration measure across all the states of the decay units. This can therefore further increase the accuracy and the reliability.

At least one decay unit preferably produces a state with a time constant between 0.5 hours and 2 hours. At least one decay unit particularly produces a state with a time constant of one hour. This corresponds to typical magnitudes of interruption periods during workshop visits or also during downtimes of the vehicle, for example, when making purchases or during a business meeting.

The control unit may be configured to generate an initialization time for the end of the interruption period on the basis of the time stored at the start of the interruption period in a number of duration measures. This can mean, for example, that the control unit creates a forecast of a time, on starting-up the device following a power failure, on the basis of the duration measure and the time stored at the start of the interruption period. If a time, which is otherwise measured or obtained, for example from satellite navigation, varies by more than a predetermined absolute or relative measure from this forecast, it can be concluded that the system is malfunctioning or has been compromised. It is therefore possible to prevent incorrect messages from being processed.

In addition, the invention relates to a vehicle-to-X-communication module which comprises a device according to the invention in order to monitor a time during a failure of a power supply to the vehicle-to-X-communication module. With regard to the device according to the invention, recourse can in this case be had to all of the embodiments and variants described herein.

Generally, it can be mentioned that a physical degradation process having a defined decay time can be used in order to obtain a "clock" which continues running even without a power supply, which can be used to measure the time which has elapsed since the last shutdown. The model for this is the C14 method known from archaeology, which uses the decay time of radioactive C14 in organic objects as a clock.

A capacitor, a battery, or similar is typically suitable for implementation in a vehicle's electronic system. Such an element can be charged, for example, during operation and definitively discharged following switching off, for example across a precisely defined discharge resistor. Following switching on again or restarting, the discharge voltage is then measured and a conclusion can then be drawn about the switching-off time by means of the characteristics of the storage element.

A discharge voltage of a capacitor is typically defined by means of the following formula:

$$u_C(t) = U_0 e^{-t/(R_C C)},$$

where:
$u_C(t)$ denotes the discharge voltage at time t,
$U_0$ denotes the voltage at the start of the interruption period,
t denotes the current time,
$R_C$ denotes the resistance of a discharge resistor, and
C denotes the capacity of the capacitor.

An implementation having a resistor of $R_C=1$ MΩ at a capacitor with a capacity of C=1 mF at an output voltage of $U_0=10$V would therefore, for example, have a residual voltage of approximately 0.07 V after a time of t=5000 s. A period of, for example, approximately one hour can therefore be measured. The switching-off time can be calculated from the residual voltage, with which rapid test cycles which are typical of hacking attempts are recognized.

A conclusion can be drawn about the current time together with the last time stored and the plausibility of this can be checked with the current time which can be simulated, for example, by a hacker. The time can therefore be advantageously measured in the switched-off system without a permanent power supply and, if necessary, hacker attacks can be detected by means of the simulation of the environment.

It is, for example, possible to obtain a start time of an electronic control unit ("ECU") or a vehicle-to-X-communication module from the decay behavior of a storage element.

The provision of a real-time clock can advantageously be dispensed with, since a current system time can be calculated by means of a device according to the invention. A suitably implemented control module does not need to be energized, for example, when the vehicle is switched off.

During the shutdown or at the start of an interruption period the current system time and the current value of the produced state, for example the voltage at a capacitor, are advantageously stored at the same time. These two variables therefore correlate at the shutdown time.

A measurement of the state is preferably carried out when the device or the control module starts up. It is then possible to calculate back to the time since the vehicle was shut down from the time constant. This time period can then be added to the system time stored during the shutdown, and the system time can be initialized with the time calculated in this way.

Possible decay elements or decay units can typically be disrupted in their decay behavior in each case by different external factors. Possible external factors are, for example, temperature, air humidity, radiation or air pressure. In order to improve the accuracy of the time initialization, it is possible to use decay elements or decay units with dependences on various external factors. On average, a better determination of the actual time since the shutdown can be achieved.

The decay time or the respective time constant of such a system or of the corresponding decay units is preferably selected such that typical switching-off times can be bridged therewith. Another possibility is to implement multiple systems with different time constants, in order to be able to optimally serve different switching-off times. Examples of switching-off times or time constants can be:

a few seconds, e.g. 1 to 10 s (security as an application, 5000 s can also be used for example depending on the application),
a few minutes, e.g. 1 to 10 minutes (typical short stop),
a few hours, e.g. 1 to 2 hours (typical purchase),
half-day to day (standard working time can therefore be covered, as well as overnight parking),
weeks, e.g. 1 to 2 weeks, or 1 to 3 weeks (absence on holiday).

A power consumption of a system or of a device can, for example, be significantly reduced during the shutdown of the vehicle and a good initialization of the system time is nevertheless made possible by means of the procedure described.

BRIEF DESCRIPTION OF THE DRAWINGS

Other advantages of the disclosed subject matter will be readily appreciated, as the same becomes better understood by reference to the following detailed description when considered in connection with the accompanying drawings wherein:

FIG. 1 shows a device for monitoring the time during an interruption period according to one exemplary embodiment.

DETAILED DESCRIPTION

Referring to the Figures, a device 10 for monitoring the time during an interruption period is shown and described herein.

The device 10 comprises a first decay link 21, a second decay link 22 and a third decay link 23. The respective decay links 21, 22, 23 are merely shown schematically in FIG. 1. In one exemplary embodiment, the decay links 21, 22, 23 are realized as capacitors (not shown) which are each wired up to resistors (not shown), by means of which they can be definitively discharged when voltage is no longer applied. As long as the device 10 is supplied with voltage or current by a power supply, which is not shown, the capacitors of the decay links 21, 22, 23 remain at the respective known and constant voltages. If the power supply fails, the respective voltages reduce in accordance with the respective exponential functions with the respective time constants. In this case, the time constants are different, wherein for example, values of an hour, half a day and a week can be combined.

A system time clock is implemented in the device 10 in a manner which is not shown in more detail. The system time clock displays the current time, but which is not immune to power failures. Therefore, if the power supply to the device 10 breaks down, the system time clock does not continue running and the displayed time is no longer valid.

The device 10 further comprises a control module 30. The control module 30 includes a storage unit 31 which is configured to store the respective time in the event of a failure of the power supply. This is effected by a buffering of the supply through capacitors, which buffering is sufficient to store the respective time.

The control module 30 further includes a measuring unit 32 which is configured to measure the respective voltages of the capacitors of the decay units 21, 22, 23. The measurement is carried out in each case during the start-up of the device 10, i.e., when a respective power supply is available again.

In addition, the control module 30 includes a control unit 33 which is configured to calculate a time period which corresponds to the length of an interruption period, on the basis of the measured voltages and the time stored in the storage unit 31. The capacitor whose voltage is located within a range which can be easily and reliably measured, i.e., which has dropped sufficiently far but which has not yet fallen to close to zero, can in particular be used for this purpose.

A current time can at least be coarsely determined by means of the measured time period and the time stored in the storage unit. This can serve as the initialization of the system time clock following the power failure. If times which are otherwise determined, for example times determined using satellite navigation, significantly deviate from this, it can be assumed that the system has been compromised or is malfunctioning. In this case, suitable measures can be taken to ensure the safe operation of components, and to avoid processing incorrect or compromised messages.

Generally, it should be noted that vehicle-to-X communication refers to, in particular, direct communication between vehicles and/or between vehicles and infrastructure facilities. For example, this can be vehicle-to-vehicle communication or vehicle-to-infrastructure communication. Inasmuch as reference is made to communication between vehicles within the context of this disclosure, this can in principle be effected, for example, within the context of vehicle-to-vehicle communication which typically takes place without relaying via a mobile network or a similar external infrastructure and which should therefore be delimited from other solutions which build, for example, on a mobile network. Vehicle-to-X communication can take place, for example, using the IEEE 802.11p or IEEE 1609.4 standards. Vehicle-to-X communication can also be designated C2X communication. The subareas can be referred to as C2C (car-to-car) or C2I (car-to-infrastructure). This disclosure does not, however, explicitly exclude car-to-X communication with relaying, for example, via a mobile network.

The claims associated with the application do not constitute a waiver of the attainment of more extensive protection.

If it emerges in the course of the process that a feature or a group of features is not absolutely necessary, the applicant is already striving for a wording of at least one independent claim which no longer comprises the feature or group of features. This can be, for example, a sub-combination of a claim which exists on the date of filing or a sub-combination of a claim which exists on the date of filing, which is limited by additional features. Such claims needing to be reworded or combinations of features are to be understood to also be covered by the disclosure of this application.

It should further be noted that configurations, features and variants of the invention, which are described in the various embodiments or embodiment examples and/or which are shown in the figures, can be combined in any way whatsoever with each other. Individual or multiple features can be exchanged with one another at will. Combinations of features resulting herefrom are to be understood to also be covered by the disclosure of this application.

References in the subordinate claims are not to be understood to constitute a waiver of the attainment of independent, objective protection for the features of the subordinate claims referring back to the principal claims. These features can also be combined at will with other features.

Features, which are merely disclosed in the specification or features which are only disclosed in the specification or in a claim in conjunction with other features, can in principle be of independent importance and essential to the invention. They can therefore also be individually incorporated into claims in order to delimit the invention from the prior art.

The present invention has been described herein in an illustrative manner, and it is to be understood that the terminology which has been used is intended to be in the nature of words of description rather than of limitation. Obviously, many modifications and variations of the invention are possible in light of the above teachings. The invention may be practiced otherwise than as specifically described within the scope of the appended claims.

What is claimed is:

1. A vehicle-to-X-communication module executing a communication protocol and comprising a device for monitoring the time during an interruption period to monitor a time during a failure of a power supply to the vehicle-to-X-communication module, wherein the device comprises:

a storage device storing a time at the start of the interruption period, a decay device producing a continually decaying state over the interruption period, a measuring device measuring the decaying state at least at the end of the interruption period, and a control device generating a duration measure indicative of the length of the interruption period based on the measured state at the end of the interruption period;

wherein the control device generates an initialization time for the end of the interruption period on the basis of the time stored at the start of the interruption period and the duration measure.

2. The vehicle-to-X-communication module according to claim 1, wherein the interruption period corresponds to the length of time of a power failure.

3. The vehicle-to-X-communication module according to claim 1, wherein the decay device is an electrical capacitor and the decaying state is a voltage dropping across the capacitor.

4. The vehicle-to-X-communication module according to claim 3, wherein the capacitor is electrically connected to at least one resistor so that a time constant of the decaying voltage can be adjusted by means of the capacitor and/or the resistor.

5. The vehicle-to-X-communication module according to claim 1, wherein the measuring device is configured to also measure the state at the start of the interruption period, and the control device is configured to also measure the duration measure on the basis of the measured state at the start of the interruption period.

6. The vehicle-to-X-communication module according to claim 1, wherein the control device is configured to trigger a measurement of the state at the start and/or at the end of the interruption period.

7. The vehicle-to-X-communication module according to claim 1, wherein the device comprises a plurality of decay units which each produce continually decaying states.

8. The vehicle-to-X-communication module according to claim 7, wherein the decay devices produce states with different time constants of the decay.

9. The vehicle-to-X-communication module according to claim 7, wherein each decay device comprises its own measuring device, or the measuring device is configured to measure the states of all of the decay devices.

10. The vehicle-to-X-communication module according to claim 7, wherein the control device generates a respective duration measure for each decay device on the basis of a number of measurements of the respective state.

11. The vehicle-to-X-communication module according to claim 7, wherein the states of the decay devices have different dependences on a number of parameters.

12. The vehicle-to-X-communication module according to claim 11, wherein the parameters are temperature, air humidity, radiation, and/or air pressure.

13. The vehicle-to-X-communication module according to claim 7, wherein the control device is configured to generate an averaged or common duration measure across all the states of the decay devices.

14. The vehicle-to-X-communication module according to claim 1, wherein at least one decay device produces a state with a time constant between 0.5 hours and 2 hours.

15. The vehicle-to-X-communication module according to claim 1, wherein the control device compares the initialization time with an obtained accurate time.

16. The vehicle-to-X-communication module according to claim 15, wherein the control device signals a malfunction in response to the initialization time varying from the obtained accurate time by a predetermined value.

* * * * *